(12) United States Patent
Knapman et al.

(10) Patent No.: US 6,298,455 B1
(45) Date of Patent: Oct. 2, 2001

(54) PUBLISH AND SUBSCRIBE DATA PROCESSING WITH FAILOVER USING CASCADED SEQUENCE NUMBERS

(75) Inventors: John Michael Knapman, Eastleigh (GB); Michael Wayne Young, Pittsburg, PA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/222,048

(22) Filed: Dec. 29, 1998

(51) Int. Cl.[7] .................................................. H02H 3/05
(52) U.S. Cl. ................ 714/43; 714/40; 709/223; 709/231; 707/10
(58) Field of Search ................ 714/4, 6, 40, 43, 714/44, 48; 707/10, 104, 102, 100, 203; 709/213, 217, 219, 223, 225, 231

(56) References Cited

U.S. PATENT DOCUMENTS 6,044,372 * 3/2000 Rothfus et al. ...................... 707/10
6,058,389 * 5/2000 Chandra et al. ...................... 707/1
6,182,143 * 1/2001 Hastings et al. ...................... 709/231

* cited by examiner

*Primary Examiner*—Robert Beausoleil
*Assistant Examiner*—Raymond N Phan
(74) *Attorney, Agent, or Firm*—Gregory M. Doudnikoff

(57) ABSTRACT

In a publish/subscribe data processing broker network having a plurality of broker data processing apparatuses, each of which has an input for receiving published messages directly from a publisher application and/or receiving subscription data directly from a subscriber application, and each of which having a means for receiving a published message on a first topic and assigning a broker-specific sequence number to the received message; a first broker apparatus has: a software unit for determining a failure of a neighboring broker apparatus which has provided published messages on the first topic to the first broker apparatus; and a software unit for sending historic resubscriptions with respect to the first topic to each antecedent broker apparatus of the failed neighboring broker apparatus by using the broker-specific sequence number corresponding to each antecedent broker apparatus.

10 Claims, 3 Drawing Sheets

PUBLISH AND SUBSCRIBE DATA PROCESSING WITH FAILOVER USING CASCADED SEQUENCE NUMBERS

FIELD OF THE INVENTION

The present invention relates to the field of data processing and more specifically to data processing which distributes messages from suppliers (called, hereinafter, "publishers") of data messages to consumers (called, hereinafter "subscribers") of such messages.

BACKGROUND OF THE INVENTION

Publish/subscribe data processing systems have become very popular in recent years as a way of distributing data messages from publishing computers to subscribing computers. The increasing popularity of the Internet, which has connected a wide variety of computers all over the world, has helped to make such publish/subscribe systems even more popular. Using the Internet, a World Wide Web browser application (the term "application" or "process" refers to a software program, or portion thereof, running on a computer) can be used in conjunction with the publisher or subscriber in order to graphically display messages. Such systems are especially useful where data supplied by a publisher is constantly changing and a large number of subscribers needs to be quickly updated with the latest data. Perhaps the best example of where this is useful is in the distribution of stock market data.

In such systems, publisher applications of data messages do not need to know the identity or location of the subscriber applications which will receive the messages. The publishers need only connect to a publish/subscribe distribution agent process, which is included in a group of such processes making up a broker network, and send messages to the distribution agent process, specifying the subject of the message to the distribution agent process. The distribution agent process then distributes the published messages to subscriber applications which have previously indicated to the broker network that they would like to receive data messages on particular subjects. Thus, the subscribers also do not need to know the identity or location of the publishers. The subscribers need only connect to a distribution agent process.

One such publish/subscribe broker network which is currently in use, and which has been developed by the Transarc Corp. (a wholly owned subsidiary of the assignee of the present patent application, IBM Corp.) is shown in FIG. 1. Publishers 11 and 12 connect to the publish/subscribe broker network 2 and send published messages to broker network 2 which distributes the messages to subscribers 31, 32, 33, 34. Publishers 11 and 12, which are data processing applications which output data messages, connect to broker network 2 using the well known inter-application data connection protocol known as remote procedure call (or RPC). Each publisher application could be running on a separate machine, alternatively, a single machine could be running a plurality of publisher applications. The broker network 2 is made up of a plurality of distribution agents (21 through 27, which will also be referred to herein as "brokers") which are connected in a hierarchical fashion which will be described below as a "tree structure". These distribution agents, each of which could be running on a separate machine, are data processing applications which distribute data messages through the broker network 2 from publishers to subscribers. Subscriber applications 31, 32, 33 and 34 connect to the broker network 2 via RPC in order to receive published messages.

Publishers 11 and 12 first connect via RPC directly to a root distribution agent 21 which in turn connects via RPC to second level distribution agents 22 and 23 which in turn connect via RPC to third level distribution agents 24, 25, 26 and 27 (also known as "leaf distribution agents" since they are the final distribution agents in the tree structure). Each distribution agent could be running on its own machine, or alternatively, groups of distribution agents could be running on the same machine. The leaf distribution agents connect via RPC to subscriber applications 31 through 34, each of which could be running on its own machine.

In order to allow the broker network 2 to determine which published messages should be sent to which subscribers, publishers provide the root distribution agent 21 with the name of a distribution stream for each published message. A distribution stream (called hereinafter a "stream") is an ordered sequence of messages having a name (e.g., "stock" for a stream of stock market quotes) to distinguish the stream from other streams. Likewise, subscribers provide the leaf distribution agents 31 through 34 with the name of the streams to which they would like to subscribe. In this way, the broker network 2 keeps track of which subscribers are interested in which streams so that when publishers publish messages to such streams, the messages can be distributed to the corresponding subscribers. Subscribers are also allowed to provide filter expressions to the broker in order to limit the messages which will be received on a particular stream (e.g., a subscriber 31 interested in only IBM stock quotes could subscribe to the stream "stock" by making an RPC call to leaf distribution agent 24 and include a filter expression stating that only messages on the "stock" stream relating to IBM stock should be sent to subscriber 31).

The above-described publish/subscribe broker network architecture provides the advantage of central coordination of all published messages, since all publishers must connect to the same distribution agent (the root) in order to publish a message to the broker network hierarchy. For example, total ordering of published messages throughout the broker hierarchy is greatly facilitated, since the root can easily assign sequence numbers to each published message on a stream.

Total ordering allows something called "failover" to be carried out. In failover, should a first distribution agent (e.g., 22) fail for any reason (e.g., a power loss due to a local thunderstorm) other distribution agents (e.g., 24 and 25) which communicate directly with this first distribution agent will instead transfer their subscriptions to (failover to) a second distribution agent (e.g., 23) which is a sibling of the first distribution agent (e.g., 22. The totally ordered stream feature allows distribution agents 24 and 25 to make an historic re-subscription to distribution agent 23 so as to pick up where they left off before the failure in terms of receiving published messages on the streams to which they have subscriptions. Specifically, in an historic resubscriptions, distribution agent 24 would make a subscription request to distribution agent 23 asking for all future published messages on a stream as well as all past messages back to the particular sequence number (provided with the historic resubscriptions request) of the last message that distribution agent 24 received on the stream from distribution agent 22 before distribution agent 22 failed. This ensures the distribution agent 24 receives all published messages on the stream despite the fact that distribution agent 22 has failed.

However, this FIG. 1 architecture also has the disadvantage of publisher inflexibility, since each publisher is constrained to publishing from the single root distribution agent, even when it would be much easier for a publisher to connect to a closer distribution agent. Accordingly, publish/ subscribe software designers are beginning to consider architectures where publishers are allowed to publish messages directly to any distribution agent in the broker network. This clearly has the advantage of removing the above-mentioned constraint on publishers. However, as with any tradeoff, it presents other problems. For example, providing total ordering of published messages on a stream is very difficult, since there is no longer a central distribution agent (broker) from which all publishers must publish. In other words, the central coordination at the root that was present in the above-mentioned root-based architecture and that made failover so straightforward is no longer available.

Thus, there is a great need in the publish/subscribe data processing art for a way to carry out failover when the publish/subscribe broker network architecture does not provide for totally ordered streams.

SUMMARY OF THE INVENTION

According to one aspect, the present invention provides In a publish/subscribe data processing broker network having a plurality of broker data processing apparatuses, each of which has an input for receiving published messages directly from a publisher application and/or receiving subscription data directly from a subscriber application, and each of which having a means for receiving a published message on a first topic and assigning a broker-specific sequence number to the received message; a first broker apparatus comprising:

means for determining a failure of a neighboring broker apparatus which has provided published messages on the first topic to the first broker apparatus; and means for sending historic resubscriptions with respect to the first topic to each antecedent broker apparatus of the failed neighboring broker apparatus by using the broker-specific sequence number corresponding to each antecedent broker apparatus.

According to a second aspect, the present invention provides a data processing method having method steps corresponding to each element of the data processing apparatus of the first aspect of the invention.

According to a third aspect, the present invention provides a computer readable storage medium having a computer program stored on it which, when executed on a computer, carries out the functionality of data processing method of the second aspect of the invention.

Thus, with the present invention, by the use of the broker-specific sequence numbers, failover is made possible in a publish/subscribe broker network despite the fact that totally ordered streams are not present.

BRIEF DESCRIPTION OF THE DRAWINGS

The invention will be better understood by referring to the detailed description of the preferred embodiments which will now be described in conjunction with the following drawing figures.

DETAILED DESCRIPTION OF THE PREFERRED EMBODIMENTS

Figure 1:
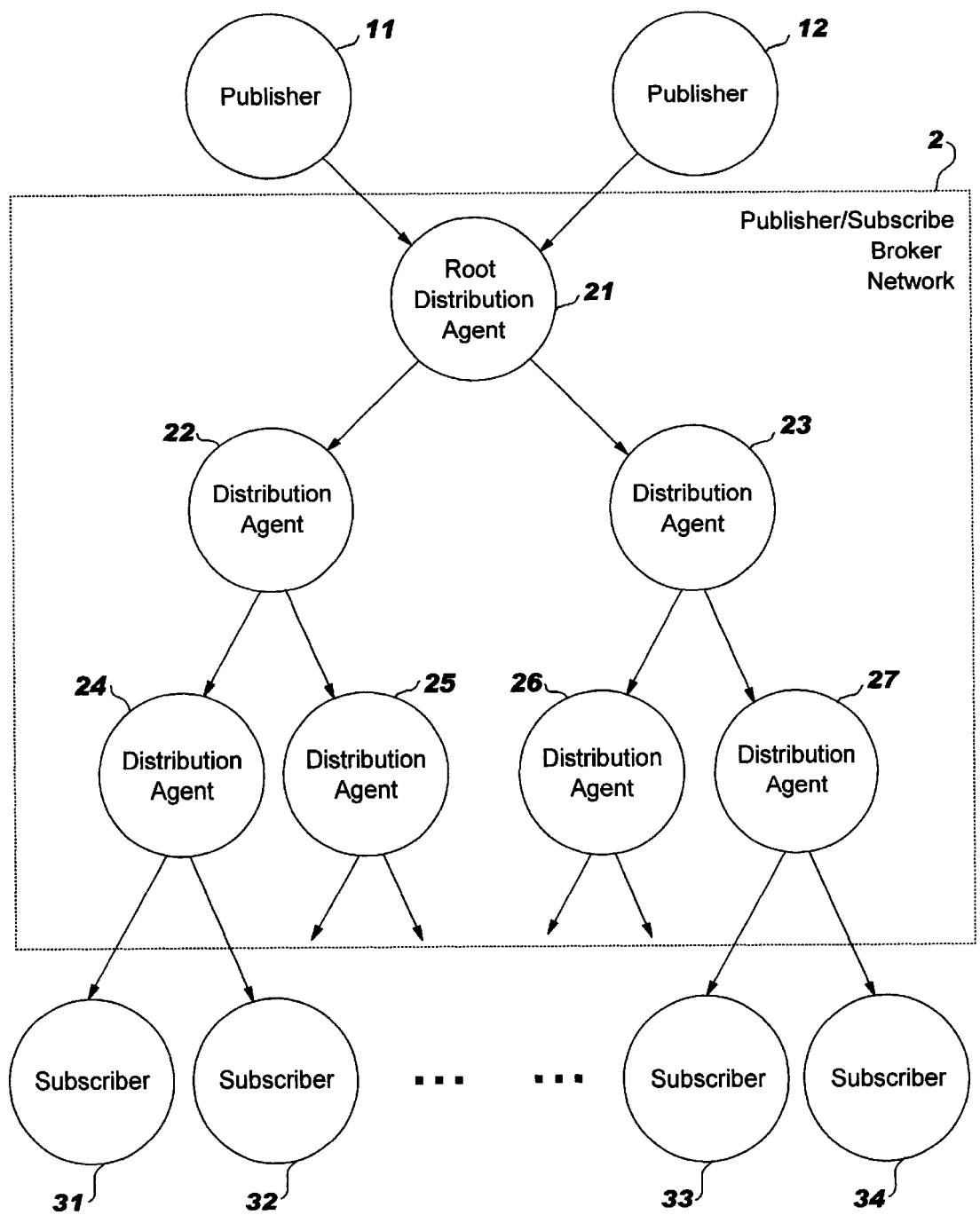
FIG. 1 shows the architecture of a prior art publish/ subscribe broker network which was referred to above.

In the prior art FIG. 1 discussed above, a publisher application 11, running on one computer, is, for example, a supplier of live stock market data quotes. That is, publisher application 11 provides frequent messages stating the present value of share prices. In this example, publisher application 11 is publishing messages on a stream called "stock" which has already been configured in the broker network 2. As is well known, when publisher 11 wishes to publish a stock quote message to stream "stock", publisher 11 makes an RPC call to the root distribution agent 11 which is at the top level of the broker tree structure. In this example, subscriber application 32, running on another computer, has sent a subscription request via an RPC call to leaf distribution agent 24, which is at the bottom level of the tree structure, indicating that subscriber 32 would like to subscribe to stream "stock".

Thus, whenever publisher 11 publishes a data message to stream "stock" the distribution tree structure of broker network 2 channels the message down through the root distribution agent 21, through any intermediary distribution agents (e.g., 22 in the example of FIG. 1) and through the leaf distribution agent 24 to the subscriber 32. This involves a series of RPC calls being made between each successive circle in the diagram of FIG. 1 connecting publisher 11 and subscriber 32 (i.e., 11 to 21, 21 to 22, 22 to 24 and 24 to 32).

Figure 2:
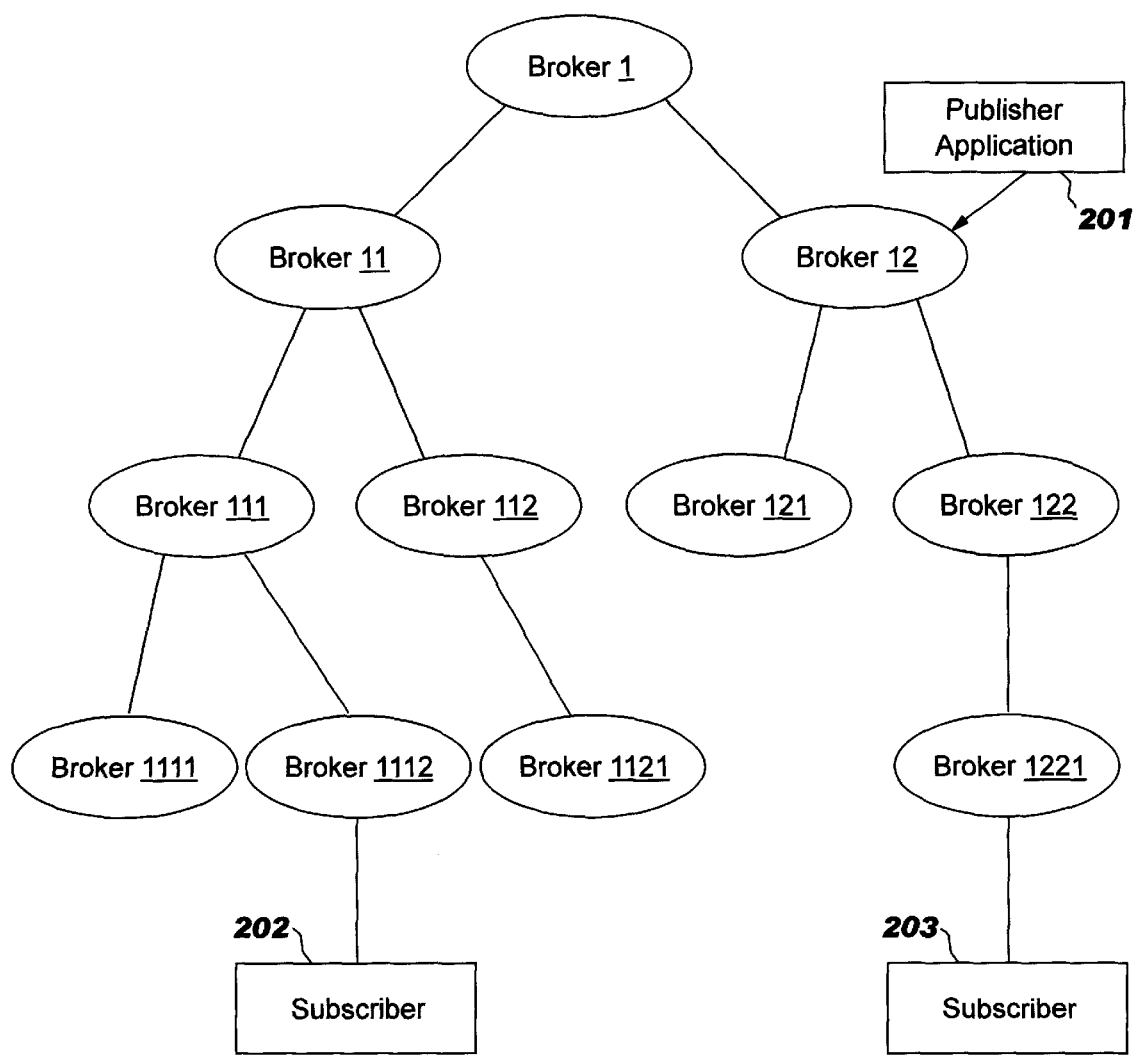
FIG. 2 shows the architecture of a publish/subscribe broker network according to which the preferred embodiment of the present invention will be explained below.

FIG. 2 shows a different publish/subscribe architecture where publisher applications can publish messages to the broker network by directly communicating with any one of a plurality of distribution agents (also referred to herein as "brokers"). For example, publisher application 201 is shown communicating directly with Broker 12. There is no requirement in this architecture that all publisher applications communicate directly with a top (or root) distribution agent. Publisher application 201 can potentially communicate directly with any of the distribution agents shown in FIG. 2, in the described examples below it will be shown communicating directly with Broker 12.

Subscriber applications 202 and 203 would like to receive messages on the stream/topic that publisher application 201 is publishing on. Thus, subscriber applications 202 and 203 communicate directly with Brokers 1112 and 1221, respectively, to provide subscription data thereto informing the broker hierarchy of their desire to receive such published messages. Since the publisher application 201 is allowed to communicate directly with any of a plurality of distribution agents, the subscription data entered by the subscriber applications must be propagated throughout the broker network to each broker shown in FIG. 2. This way, no matter which distribution agent the publisher application 201 happens to communicate directly with, the published messages will be able to be routed to the subscriber applications 202 and 203. However, as mentioned above, the lack of central coordination of sequence numbers of published messages has prevented failover from being carried out with respect to this type of publish/subscribe broker network architecture.

Figure 3:
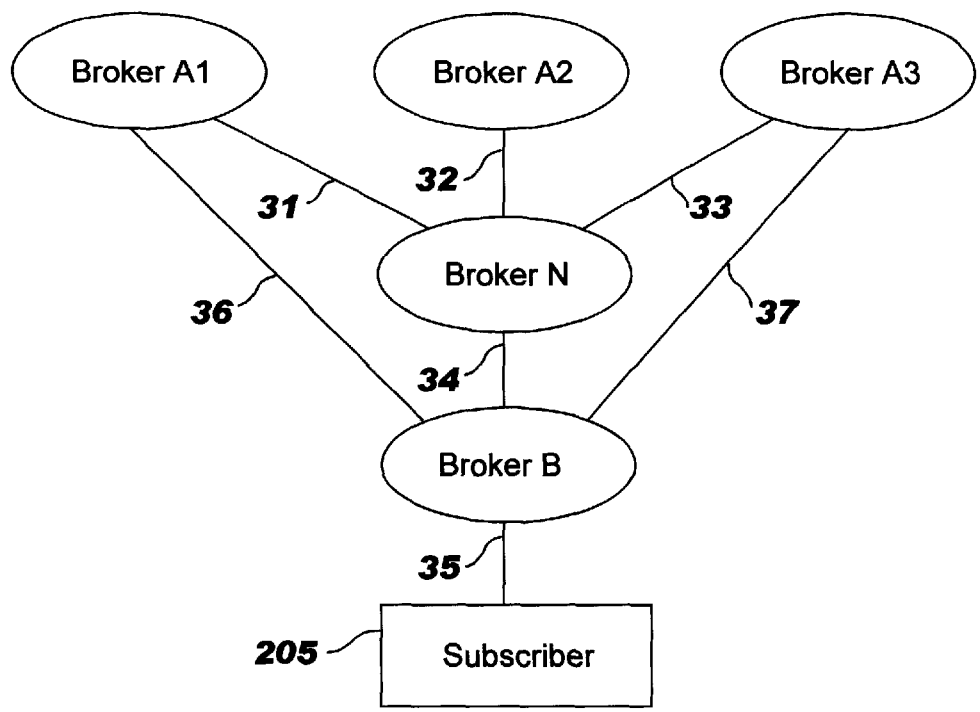
FIG. 3 shows an example of the broker network of FIG. 2, which will be used to explain the failover technique according to a preferred embodiment of the present invention.

A technique for carrying out failover in this architecture according to a preferred embodiment of the present invention will now be described with reference to FIG. 3 using a specific example.

Broker B has a subscription to the topic "IBM stock" which is a stream on which publishers publish the most recent value of IBM share prices. Subscriber 205, which has previously registered a subscription with broker B, is receiving such published messages via network link 35 from broker B. Broker B has a neighbor, broker N, which is passing the published messages on the IBM stock topic to broker B via link 34 (broker B may also be receiving published messages from other brokers via other links). Broker N has three neighbors: broker A1, broker A2 and broker A3, which are each supplying broker N with published messages on the IBM stock topic via links 31, 32 and 33, respectively. Brokers A1, A2 and A3 will be referred to as "antecedents" of broker N, so that later when we discuss broker B's relationship with the other brokers in FIG. 3, we can clearly distinguish between broker B's relationship with broker N and broker B's relationship with brokers A1, A2 and A3.

Figure 4:
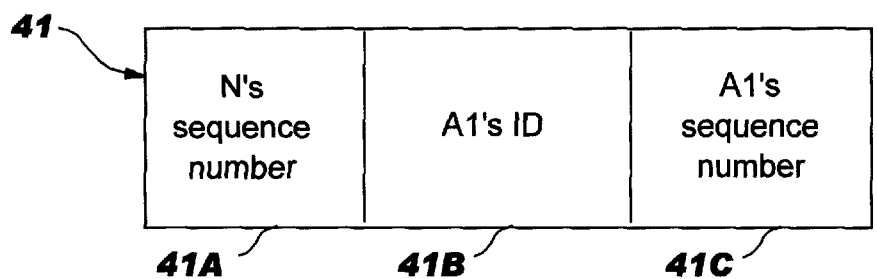
FIGS. 4 and 5 each show a published message with cascaded sequence numbers, according to a preferred embodiment of the present invention.

Each broker assigns its own sequence number to each published message it receives on a topic (e.g., IBM stock). This sequence number is added to the published message. In addition, each broker carries forward the sequence number and identifer (ID) of the neighbor that supplied the message. For example, in FIG. 4, if a published message on the topic IBM stock passes to broker N from broker A1 via link 31, broker N assigns a broker-specific (i.e., specific to the broker N) sequence number (an integer which increases by "one" each time a published message passes through the broker N) to the published message and this broker-specific sequence number is added to the published message at field 41A, along with, in fields 41B and 41C, respectively, the identifier (ID) and sequence number (e.g., n1) of broker A1 which passed along the message to broker N. If broker N then passes this message on to broker B via link 34, then when broker B receives the message, broker B adds its own broker-specific sequence number to the published message in field 41A while moving broker N's sequence number from field 41A to field 41C, discarding broker B's antecedent's sequence number (A1's sequence number) from field 41C, discarding A1's ID from field 41B and inserting the ID of broker N into field 41B. In FIG. 4, the fact that two sequence number are included in the same published message is referred to herein as a "cascading" of sequence numbers.

Figure 5:
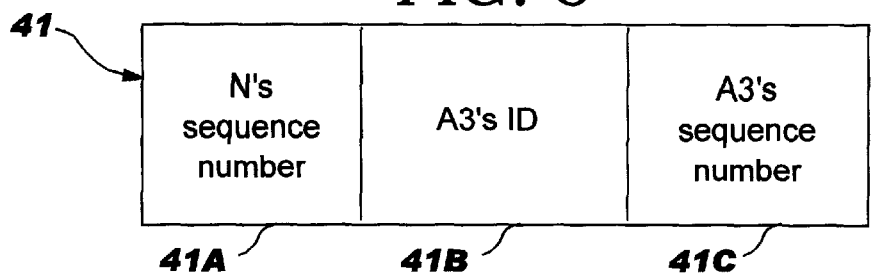

Continuing with the example described above, broker N also receives a published message on topic "IBM stock" from broker A3 along link 33 along with the sequence number (e.g., n3) which A3 has assigned to this message and which A3 has placed in the message at field 41A. Broker N then moves broker A3's sequence number n3 from the field 41A to the field 41C (see FIG. 5), places broker A3's ID in field 41B and places broker N's own sequence number for this message into field 41A. Broker N then passes along the published message to broker B.

When broker B passes this message on further (i.e., to another broker or to subscriber 205) broker B will discard from field 41C the sequence number n3 from its antecedent A3, discard from field 41B A3's ID, inserts the ID of broker N into field 41B and the sequence number of broker N into field 41C, and inserts broker B's own sequence number into field 41A.

Broker B maintains a list of the latest sequence number received from each antecedent (A1, A2, A3) of its neighbor N. We call the substreams arriving at broker B from broker N's antecedents (through broker N) "currents". Broker B maintains a list of currents for each of its neighbors (e.g., the list for broker N in this case) and for each topic (stream). So, in the above example, broker B keeps a list of currents that would designate n1 as the latest sequence number from A1 (through N) and n3 as the latest sequence number from A3 (through N), and nothing listed for A2. The ID of each broker corresponding to the stored latest sequence numbers is also stored in the list. No set-up or administration is required to name the antecedents since broker B discovers this information dynamically by examining the messages received from its neighbors. This reduces the risk of administrative errors. Alternatively, brokers could supply each other with a list of neighbors to allow each broker to prime their current lists. This deals with the case where A2 has just sent a message to N which did not reach B before N failed. Such a message is otherwise delayed until N restarts.

Continuing with the above example, if broker B determines that broker N has failed (e.g., experienced a power loss due to a thunderstorm in the area where broker N is located), broker B then performs an historic resubscriptions to brokers A1 and A3. Specifically, broker B would send an historic resubscriptions request on topic "IBM stock" to broker A1 via link 36, giving broker A1 the broker A1-specific sequence number n1 included in broker B's list of currents. This would result in broker A1 sending broker B via link 36 any published messages having sequence numbers greater than n1 and then sending broker B any future messages on topic "IBM stock". Further, broker B would send an historic resubscriptions request on topic "IBM stock" to broker A3 via link 37, giving broker A3 the broker A3-specific sequence number n3 included in broker B's list of currents. This would result in broker A3 sending broker B via link 37 any published messages having sequence numbers greater than n3 and then sending broker B any future messages on topic "IBM stock". Since nothing has come from A2, broker B will not have A2 in its list of currents and thus no resubscriptions will be necessary with respect to A2.

In order to detect a broker failure, each broker transmits a heartbeat every so many (a predetermined number of) seconds. Failover begins if a larger interval of time has passed without a message being received from a given broker (e.g., broker B fails over to its antecedents (A1, A2, A3) if it has not heard from broker N in this time). The size of these intervals is a matter of tuning to avoid false failovers and should be broadcast to all brokers using an administrative function.

When broker N resumes sending messages to broker B via line 34 (after broker N recovers from its failure and restarts), broker B can then proceed to discard duplicates of those already received directly via links 36 and 37 from the resubscriptions to the antecedents. If persistent queues are used, no messages will be missing and broker B simply cancels its resubscriptions to the antecedents and reads the messages from broker N, tracking each current until it has caught up with the direct current received from the antecedents. In the case of non-persistent queues, broker N may have lost messages. In its list of currents, broker B must maintain both the direct (from the antecedent) and the indirect (via broker N) sequence numbers and make sure that the direct sequence number is not behind the indirect sequence number before cancelling the resubscriptions to the antecedent.

In a broker network arranged as a hierarchy (e.g., as shown in FIGS. 1 and 2) a broker's neighbors will be its parent and its immediate children. In a broker network arranged as a totally-connected network (where each broker is communicating directly with every other broker) a broker's neighbors will be all the other brokers. Combinations of the two network architectures are also possible.

Although two sequence numbers are described and shown cascaded in a published message in the preferred embodiment, a different number (besides "two") can also be chosen.

There is no requirement that all brokers in the network have this failover feature, only those that need to be able to carry out the failover operation need be equipped with this feature.

We claim:

1. In a publish/subscribe data processing broker network having a plurality of broker data processing apparatuses, each of which has an input for receiving published messages directly from a publisher application and/or receiving subscription data directly from a subscriber application, and each of which having a means for receiving a published message on a first topic and assigning a broker-specific sequence number to the received message;

a first broker apparatus comprising:

means for determining a failure of a neighboring broker apparatus which has provided published messages on the first topic to the first broker apparatus; and means for sending historic resubscriptions with respect to the first topic to each antecedent broker apparatus of the failed neighboring broker apparatus by using the broker-specific sequence number corresponding to each antecedent broker apparatus.

2. The first broker apparatus of claim 1 wherein a published message received at the first broker apparatus has at least two cascaded sequence numbers: a first sequence number from the neighboring broker apparatus and a second sequence number from an antecedent broker apparatus.

3. The first broker apparatus of claim 2 wherein the means for sending historic resubscriptions uses the cascaded sequence numbers to make historic resubscriptions to the antecedent broker apparatus upon determining, via the means for determining, that the neighboring broker apparatus has failed.

4. The first broker apparatus of claim 1 wherein the network is the Internet and at least one of the subscriber application and the publisher application runs in cooperation with a World Wide Web browser application.

5. The first broker apparatus of claim 1 wherein the means for sending historic resubscriptions stores a list of the latest sequence number received from each antecedent broker apparatus of each neighboring broker apparatus.

6. In a publish/subscribe data processing broker network having a plurality of broker data processing apparatuses, each of which has an input for receiving published messages directly from a publisher application and/or receiving subscription data directly from a subscriber application, and each of which having a means for receiving a published message on a first topic and assigning a broker-specific sequence number to the received message;

a broker data processing method carried out at a broker data processing apparatus, the method comprising steps of:

determining a failure of a neighboring broker apparatus which has provided published messages on the first topic to the first broker apparatus; and sending historic resubscriptions with respect to the first topic to each antecedent broker apparatus of the failed neighboring broker apparatus by using the broker-specific sequence number corresponding to each antecedent broker apparatus.

7. The method of claim 6 wherein a published message received at the first broker apparatus has at least two cascaded sequence numbers: a first sequence number from the neighboring broker apparatus and a second sequence number from an antecedent broker apparatus.

8. The method of claim 7 wherein the means for sending historic resubscriptions uses the cascaded sequence numbers to make historic resubscriptions to the antecedent broker apparatus upon determining, via the means for determining, that the neighboring broker apparatus has failed.

9. The method of claim 6 wherein the network is the Internet and at least one of the subscriber application and the publisher application runs in cooperation with a World Wide Web browser application.

10. A computer program product stored on a computer readable storage medium for, when run on a computer, carrying out, in a publish/subscribe data processing broker network having a plurality of broker data processing apparatuses, each of which has an input for receiving published messages directly from a publisher application and/or receiving subscription data directly from a subscriber application, and each of which having a means for receiving a published message on a first topic and assigning a broker-specific sequence number to the received message;

a broker data processing method carried out at a broker data processing apparatus, the method comprising steps of:

determining a failure of a neighboring broker apparatus which has provided published messages on the first topic to the first broker apparatus; and sending historic resubscriptions with respect to the first topic to each antecedent broker apparatus of the failed neighboring broker apparatus by using the broker-specific sequence number corresponding to each antecedent broker apparatus.

* * * * *